(12) United States Patent
Rettore

(10) Patent No.: US 6,550,610 B2
(45) Date of Patent: Apr. 22, 2003

(54) FLEXIBLE CHAIN CONVEYOR

(75) Inventor: Michele Rettore, Arsego (IT)

(73) Assignee: Alit S.r.l., Frazione Marsango (IT)

( * ) Notice: Subject to any disclaimer, the term of this patent is extended or adjusted under 35 U.S.C. 154(b) by 12 days.

(21) Appl. No.: 09/852,341

(22) Filed: May 11, 2001

(65) Prior Publication Data

US 2001/0042676 A1 Nov. 22, 2001

(30) Foreign Application Priority Data

May 16, 2000 (IT) .................................... PD2000A0127

(51) Int. Cl.[7] ................................................ B65G 17/42
(52) U.S. Cl. ...................................... 198/848; 198/850
(58) Field of Search .............................. 198/848, 849, 198/850, 851, 852, 698, 834, 725

(56) References Cited

U.S. PATENT DOCUMENTS

| 3,991,876 A | | 11/1976 | Schmidt, Sr. et al. | |
|---|---|---|---|---|
| 4,244,464 A | | 1/1981 | Van Capelleveen | |
| 4,993,540 A | * | 2/1991 | van Capelleveen | ......... 198/779 |
| 5,228,557 A | * | 7/1993 | Lago | ........................... 198/778 |
| 5,454,467 A | * | 10/1995 | Lago | ........................... 198/831 |
| 5,584,377 A | * | 12/1996 | Lago | ........................... 198/841 |

FOREIGN PATENT DOCUMENTS

GB            2 084 103            4/1982

* cited by examiner

*Primary Examiner*—Khoi H. Tran

(57) ABSTRACT

A flexible chain conveyor, comprising at least one mutually parallel chain having links whereon rod-like elements are fixed transversely; the links that constitute the at least one chain being inclined by a preset angle with respect to an imaginary plane which is perpendicular to the advancement plane of the conveyor.

12 Claims, 5 Drawing Sheets

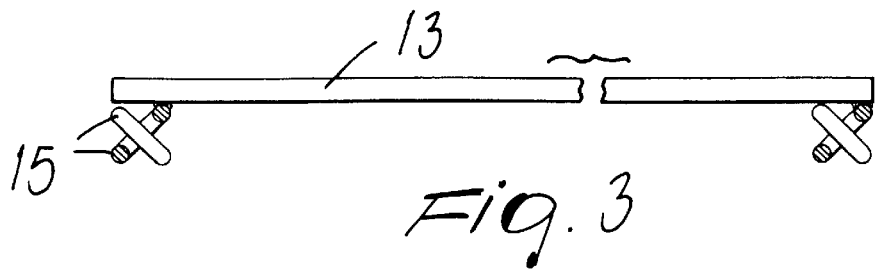
Fig. 3
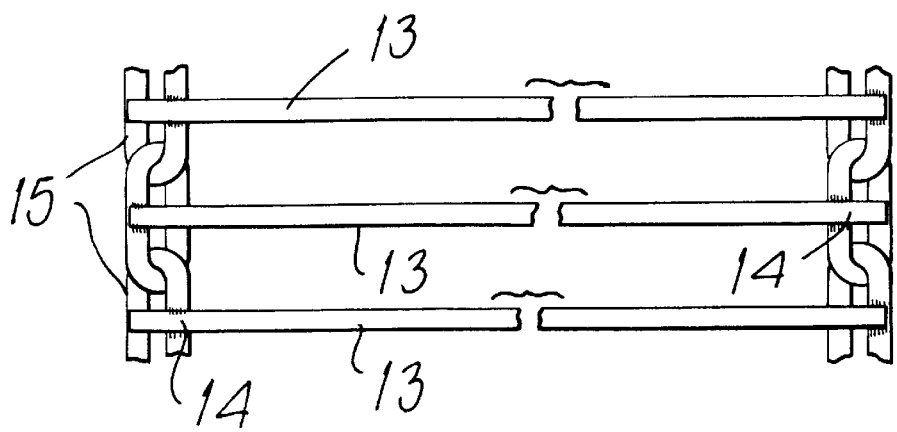
Fig. 4
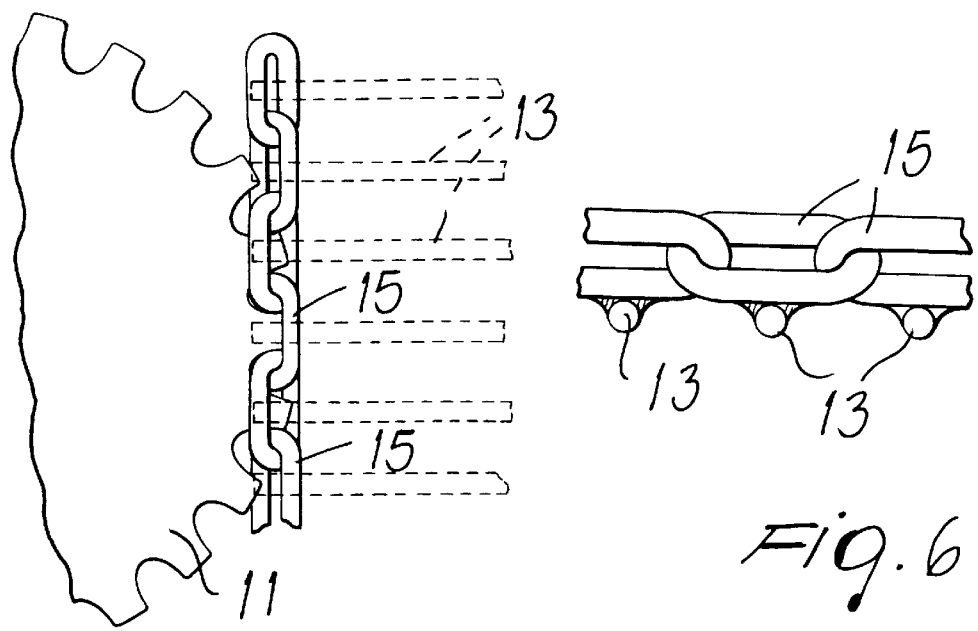
Fig. 5
Fig. 6

FLEXIBLE CHAIN CONVEYOR

BACKGROUND OF THE INVENTION

The present invention relates to a flexible chain conveyor.

It is known that chain conveyors substantially constituted by two or more parallel chains associated with motorized advancement sprockets are currently particularly appreciated thanks to their functional characteristics.

The two parallel chains are transversely connected by rod-like elements whose ends are fixed to the corresponding and opposite links of the chains.

In particular, and merely by way of example, this kind of conveyor is commonly used in the food sector in processes for deep-freezing, cooking, cooling, leavening, sterilizing food or products having similar production problems.

Currently, the links of the chains are accommodated in slot-like guides which retain them in a position which is substantially parallel to the resting and advancement surface or, vice versa, at right angles thereto.

Usually, two adjacent links of the same chain are therefore arranged substantially at right angles to each other.

Such an arrangement of the links, however, leads to a considerable space occupation of the chain which forces the manufacturer to deal with considerable complications in fixing the rod-like elements to the links.

In order to ensure the co-planar arrangement of the transverse rod-like elements fixed to the links it is in fact necessary to either skip alternate links of the series or provide connections in different points.

If instead a substantially constant pitch is required, the transverse rod-like elements are necessarily connected on different planes of arrangement, and this does not provide an ideal flat conveyance surface.

These problems are currently solved by shaping the transverse elements or by introducing shims in order to provide a flat plane of arrangement.

There is also the problem of a certain unevenness of the transverse dimensions and of the transverse load-bearing capacity of the conveyor.

Further problems can be found in the fact that not all the links can be engaged by the advancement sprockets, accordingly requiring the provision of a synchronization system which skips the links that cannot be engaged.

Furthermore, known conveyors, in order to allow meshing with the advancement sprockets, entail raising the bars, especially in the presence of bends, which problem worsens when, as frequently occurs, the conveyor has to follow a rising or descending spiral path.

Moreover, this arrangement of the links causes the gap between two successive rod-like elements to be usually rather large, thus limiting considerably the dimensions of the objects that can be conveyed.

SUMMARY OF THE INVENTION

The aim of the present invention is to provide a flexible chain conveyor which solves the drawbacks mentioned above in conventional conveyors, in particular by reducing significantly the space occupation of the chains and at the same time solving the problem of achieving a perfect co-planar arrangement of the rod-like elements that substantially constitute the resting surface of the products to be conveyed.

Within this aim, an object of the present invention is to provide a conveyor whose structure eliminates completely the need to shape the transverse rod-like elements or to introduce shims in order to ensure that the resting surface is perfectly co-planar.

Another object of the present invention is to provide a conveyor whose structure allows a substantially constant transverse load-bearing capacity without having protruding elements.

A further object of the present invention is to provide a conveyor whose structure allows optimum meshing of all the links that constitute the chains, thus simplifying synchronization with the advancement sprockets.

A still further object of the present invention is to provide a conveyor whose structure allows to reduce the curvature radii, thus reducing space occupation in rising and descending spiral paths.

Another object of the present invention is to provide a conveyor whose structure allows very short center distances between the transverse rod-like elements, thus allowing to convey even small objects, and which can be manufactured with known technologies and machines at costs being competitive with respect to those of known available conveyors.

This aim and these and other objects which will become better apparent hereinafter are achieved by a flexible chain conveyor, characterized in that it comprises at least one chain having links whereon rod-like elements are fixed transversely, said links that constitute said at least one chain being inclined by a preset angle with respect to an imaginary plane which is perpendicular to an advancement plane of the conveyor.

BRIEF DESCRIPTION OF THE DRAWINGS

Further characteristics and advantages of the present invention will become better apparent from the description of some embodiments thereof, illustrated only by way of non-limitative example in the accompanying drawings, wherein:

FIG. 3 is another partially sectional view of the conveyor of FIG. 1;

FIG. 4 is still another partially sectional view of the conveyor of FIG. 1;

FIG. 5 is a view of a detail of the conveyor of FIG. 1;

FIG. 6 is a view of another detail of the conveyor of FIG. 1;

DESCRIPTION OF THE PREFERRED EMBODIMENTS

Figure 1:
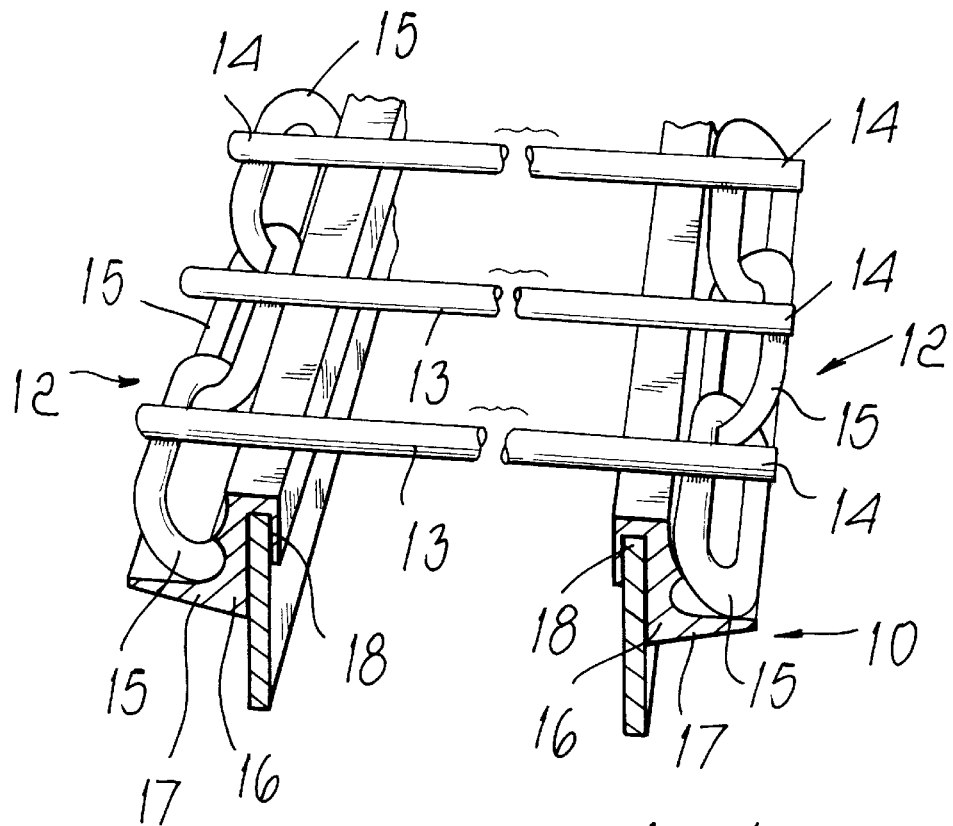
FIG. 1 is a perspective view of a conveyor having a structure according to a first embodiment of the invention.
Figure 2:
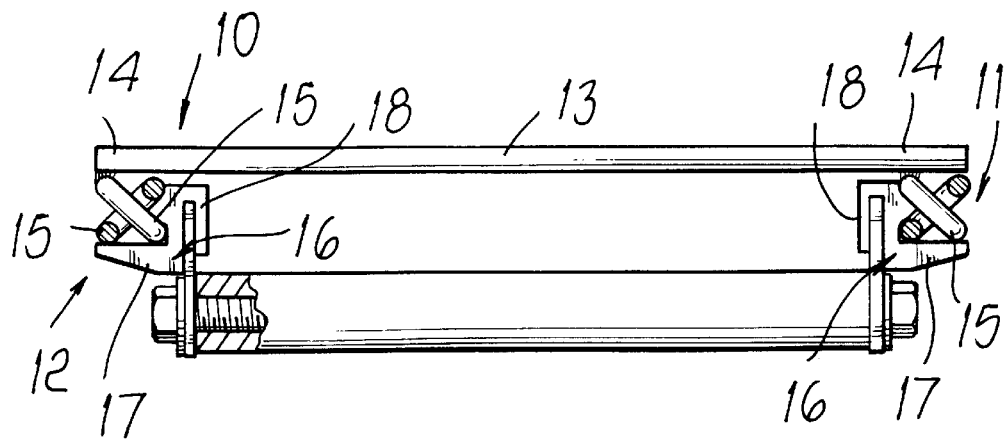
FIG. 2 is a partially sectional view of the conveyor of FIG. 1.

With particular reference to FIGS. 1 to 6, a flexible chain conveyor having the structure according to a first embodiment of the invention is generally designated by the reference numeral 10.

In particular, the flexible conveyor 10 comprises two mutually parallel chains 12 which are associated with motorized advancement sprockets 11 (shown only partially in the figures) and are mutually transversely connected by rod-like elements 13 whose ends 14 are fixed to corresponding and opposite links 15 of chains 12.

The conveyor 10 also comprises slot-like guides 16 for the guided advancement of the chains 12.

The links 15 that constitute the chains 12 are inclined, advantageously at an angle between 30° and 60°, conveniently 45°, with respect to an imaginary plane which is perpendicular to the advancement plane, so as to define fixing points for the ends 14 of the elements 13, which are all co-planar.

In particular, in this case two adjacent links 15 are inclined so as to be symmetrically opposite with respect to such plane, while two facing links 15, each belonging to a corresponding opposite chain 12, have the same orientation and inclination angle.

In particular, in this embodiment the rod-like elements 13 have the same length and the ends 14 thereof are welded to the corresponding links 15, one of the ends 14 of each rod-like element 13 being fixed in a cantilevered fashion to the corresponding link 15.

In this embodiment, the guides 16 have a cantilevered contoured crosssection 17 with a folded engagement portion 18.

Figure 7:
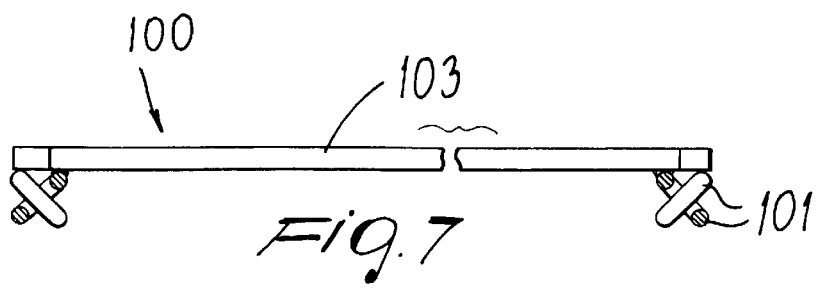
FIG. 7 is a view according to a second embodiment of the conveyor of the invention.
Figure 8:
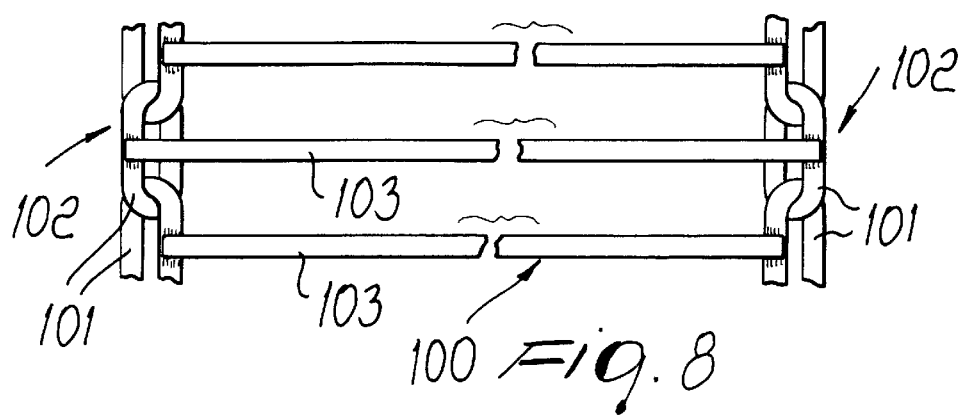
FIG. 8 is another view of the conveyor of FIG. 7.

With particular reference to FIGS. 7 and 8, a second embodiment of the conveyor according to the invention is designated by the reference numeral 100.

The conveyor 100 does not differ substantially from the conveyor 10 except in that links 101 of opposite chains 102 are inclined on opposite planes and that the rod-like elements, designated here by the reference numeral 103, have different dimensions owing to the fact that they are fixed to links 101 which have a converging or diverging arrangement.

Figure 9:
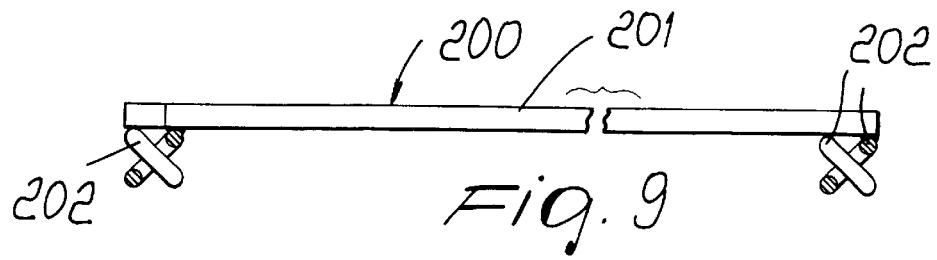
FIG. 9 is a view of a third embodiment of the conveyor of the invention.
Figure 10:
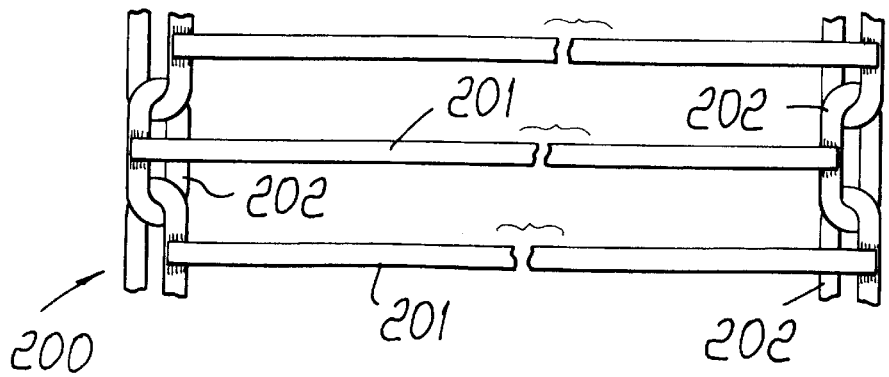
FIG. 10 is another view of the embodiment of FIG. 9.

With particular reference to FIGS. 9 and 10, a third embodiment of the conveyor according to the invention is generally designated by the reference numeral 200.

The conveyor 200 does not differ substantially from the conveyor 10 except in that the rod-like elements, designated here by the reference numeral 201, associated with links 202, have dimensions which are equal to the distance between corresponding and facing points of the links 202 to which they are fixed, such links being parallel to each other.

Figure 11:
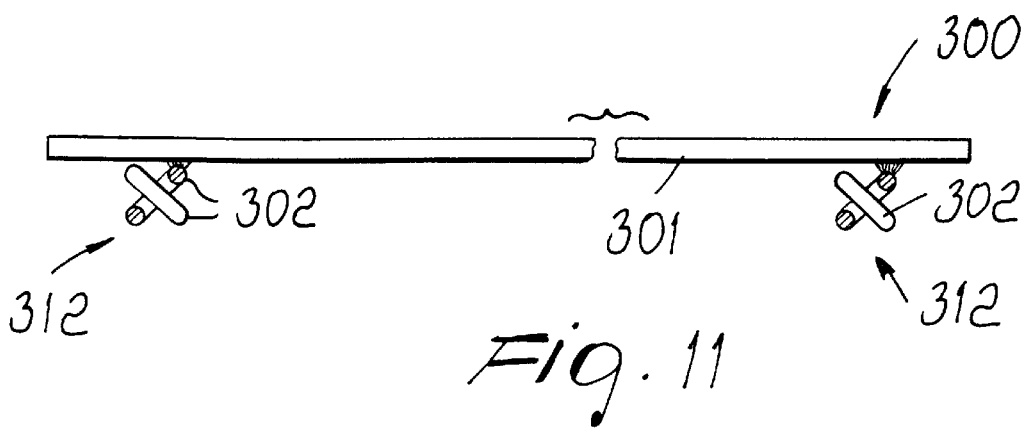
FIG. 11 is a view of a fourth embodiment of the conveyor of the invention.
Figure 12:
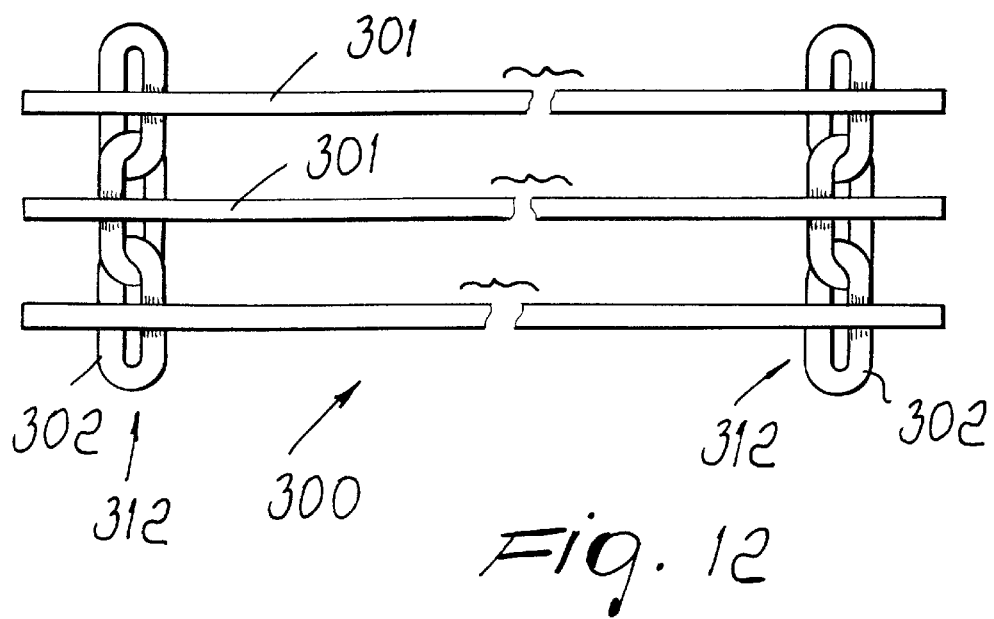
FIG. 12 is another view of the embodiment of FIG. 11.

With particular reference to FIGS. 11 and 12, a fourth embodiment of the conveyor according to the invention is generally designated by the reference numeral 300.

The conveyor 300 does not differ substantially from the conveyor 10 except in that the rod-like elements, designated here by the reference numeral 301, associated with links 302, have all the same dimensions, which are greater than the width of the chains 312; accordingly, each rod-like element protrudes with both ends from the chains.

For an equal length of the rod-like elements, this configuration allows tighter curvature radii with respect to the preceding ones thanks to the fact that the chains are closer to each other.

Figure 13:
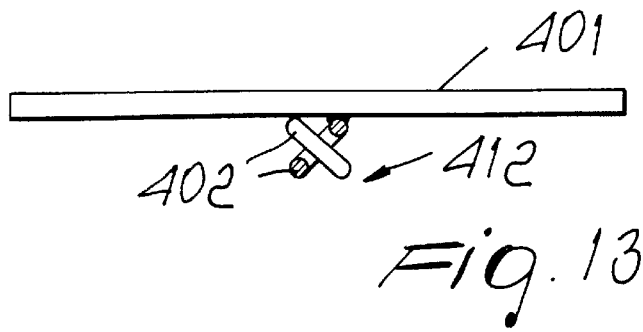
FIG. 13 is a view of a fifth embodiment of the conveyor of the invention.
Figure 14:
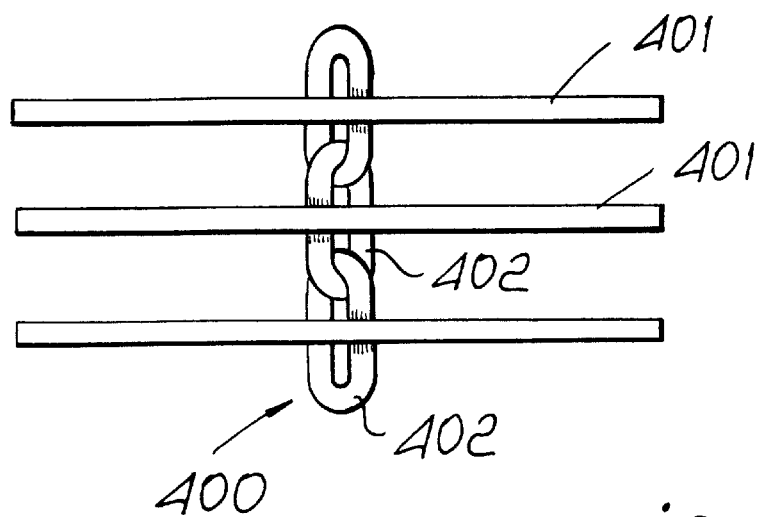
FIG. 14 is another view of the embodiment of FIG. 13.

With particular reference to FIGS. 12 and 13, a fifth embodiment of the conveyor according to the invention is generally designated by the reference numeral 400.

The conveyor 400 has a single chain 412 on which rod-like elements, designated here by the reference numeral 401, are associated by welding with links 402 which all have the same dimensions and a parallel arrangement.

In practice it has been found that the present invention has achieved the intended aim and objects.

In particular, it should be noted that the arrangement of the links of the conveyor having the structure according to the invention allows said links to ensure both reduced space occupation and a perfectly co-planar arrangement of the position and fixing of the transverse rod-like elements.

The upper and lower ends of the links are in fact all identical and co-planar, so that it is never necessary to provide for the use of shims or particular shapes of such rod-like elements.

It should also be noted that the particular arrangement of the links allows perfect meshing thereof with the advancement sprockets and ensures the possibility of smaller curvature radii than currently commercially available conveyors if the path has turns or in any event rising and descending spirals.

It should also be noted that the conveyor having the structure according to the invention has substantially constant transverse dimensions and can be manufactured with transverse elements which all have the same size.

It should also be observed that the conveyor having the structure according to the invention ensures the possibility to provide very small center distances between the rod-like elements, thus allowing grid-like configurations for supporting products even of particularly small sizes.

Moreover, the overall structure of the conveyor according to the invention achieves, as a whole, considerable constructive advantages, since its reduced dimensions and the elements that constitute it provide advantages in extrusion and calendering in curved path portions.

Figure 15:
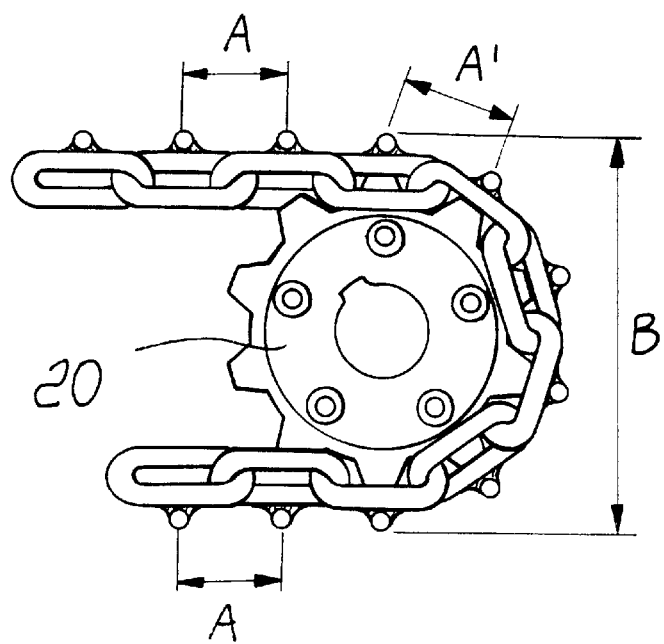
FIG. 15 is a side view of a conveyor according to the invention, taken at a guiding element constituted by a sprocket with ten teeth.

As regards the guiding elements (with reference to the symbols of FIG. 15), it should be noted that in conventional conveyors a pitch A between the rod-like elements (in the flat portions) of 27.5 mm and a distance B between the planes of arrangement between which the guiding element is interposed of 138 mm (the minimum value obtainable with bars which are part of a mesh) produce an increase of the pitch A' to 33.6 mm along the bend.

If the curvature diameter is reduced, for example by reducing the guiding element to ten teeth, the distance B between the planes of arrangement between which the guiding element is interposed becomes 117.6 mm and the bend pitch A' increases to 34.6 mm.

With a conveyor according to the invention, for an equal pitch in the flat portions, with a ten-tooth guiding element (see FIG. 15) and for an equal pitch A, the distance B between the planes of arrangement between which the guiding element is interposed is reduced to 111.2 mm and the bend pitch A' decreases to 32.5 mm.

This allows to have a reduced guiding element diameter if a mesh is used and allows a better transfer if no mesh is used.

Furthermore, the fitting of the mesh is simplified, since it can be fitted without spacers or lateral fixing devices for preventing it from protruding beyond the supporting guide, because this function is performed by the link that is inclined inward.

The present invention is susceptible of numerous modifications and variations, all of which are within the scope of the inventive concept.

Thus, for example as mentioned earlier, the rod-like elements can be part of a mesh.

Furthermore, the technical details may be replaced with other technically equivalent elements.

The materials and the dimensions may be any according to requirements.

The disclosures in Italian Patent Application No. PD2000A000127 from which this application claims priority are incorporated herein by reference.

What is claimed is:

1. A flexible chain conveyor, comprising at least one chain having links whereon rod-like elements are fixed transversely, said links that constitute said at least one chain being inclined by a preset angle with respect to an imaginary plane which is perpendicular to an advancement plane of said conveyor.

2. The flexible chain conveyor of claim 1, comprising at least two mutually parallel chains which are transversely connected by rod-like elements having ends that are fixed to corresponding and opposite links of said chains, said links that constitute said at least two chains being inclined by said preset angle with respect to the imaginary plane which is perpendicular to the advancement plane of said conveyor.

3. The conveyor according to claim 2, wherein said angle of inclination with respect to the imaginary plane of arrangement which is perpendicular to the advancement plane is between 30° and 60°.

4. The conveyor according to claim 3, wherein said inclination angle is 45°.

5. The conveyor according to claim 2, wherein two adjacent links are inclined symmetrically and in mutually opposite directions with respect to said imaginary plane which is perpendicular to the advancement plane.

6. The conveyor according to claim 2, wherein two facing links, each belonging to opposite chains, have the same orientation and angle of inclination.

7. The conveyor according to claim 2, wherein two facing links, each belonging to opposite chains, are inclined in opposite directions.

8. The conveyor according to claim 1, wherein said rod-like elements have an end which is welded to said corresponding links.

9. The conveyor according to claim 1, wherein said rod-like elements have all the same length, one of the ends of each rod-like element being fixed to the corresponding link in a cantilevered fashion.

10. The conveyor according to claim 2, wherein said rod-like elements have different lengths in relation to the inclination of the links to which said elements are fixed.

11. The conveyor according to claim 2, wherein said rod-like elements have dimensions equal to a distance between corresponding and facing points of the links to which said elements are fixed, said links having a mutually parallel arrangement.

12. The conveyor according to claim 2, wherein said rod-like elements are part of a mesh.

* * * * *